United States Patent
Matsuda et al.

[11] Patent Number: 5,184,695
[45] Date of Patent: Feb. 9, 1993

[54] METHOD FOR CONTROLLING A CHANGE-OVER BETWEEN TWO AND FOUR-WHEEL DRIVE MODES FOR A VEHICLE

[75] Inventors: Shohei Matsuda; Tadatoshi Haga; Kougyoku Go; Hiroshi Ikegami, all of Wako, Japan

[73] Assignee: Honda Giken Kogyo Kabushiki, Tokyo, Japan

[21] Appl. No.: 752,939

[22] Filed: Aug. 30, 1991

Related U.S. Application Data

[63] Continuation of Ser. No. 672,133, Mar. 19, 1991, abandoned, which is a continuation of Ser. No. 364,401, May 26, 1989, abandoned.

[30] Foreign Application Priority Data

Jun. 10, 1988 [JP]  Japan ................................ 63-143867

[51] Int. Cl.$^5$ ............................................. B60K 17/34
[52] U.S. Cl. .................................. 180/233; 180/244; 180/248
[58] Field of Search ................ 180/233, 247, 248, 249, 180/244

[56] References Cited

U.S. PATENT DOCUMENTS

| | | | |
|---|---|---|---|
| 4,538,700 | 9/1985 | Suzuki | 180/248 |
| 4,724,935 | 2/1988 | Roper et al. | 180/244 X |
| 4,735,279 | 4/1988 | Sato | 180/244 |
| 4,745,987 | 5/1988 | Buschmann | 180/249 X |
| 4,765,479 | 8/1988 | Sato | 180/244 |
| 4,770,266 | 9/1988 | Yamaguchi et al. | 180/244 X |
| 4,830,136 | 5/1989 | Sommer | 180/233 |
| 4,840,246 | 6/1989 | Yamakawa et al. | 180/233 X |
| 4,856,630 | 8/1989 | Sommer | 180/233 X |
| 4,871,043 | 10/1989 | Fujii et al. | 180/233 X |

FOREIGN PATENT DOCUMENTS

| | | |
|---|---|---|
| 0207395 | 1/1987 | European Pat. Off. |
| 0213654 | 3/1987 | European Pat. Off. |
| 0217087 | 4/1987 | European Pat. Off. |
| 60-143170 | 7/1985 | Japan |
| 2158903 | 11/1985 | United Kingdom |

OTHER PUBLICATIONS

"Automotive Engineering", vol. 38, No. 2, pp. 30-33, 234, Feb. 1989, by K. K. Tetsudo Nipponsha.
"Automotive Engineering", vol. 38, No. 7, pp. 148-159, 279, Jun. 1989, by K. K. Tetsudo Nipponsha.

Primary Examiner—Mitchell J. Hill
Attorney, Agent, or Firm—Armstrong, Westerman, Hattori, McLeland & Naughton

[57] ABSTRACT

The present invention is a method for controlling the change-over between two and four-wheel drive modes of a vehicle, wherein the two-wheel drive mode is smoothly changed to the four-wheel drive mode during acceleration in the two-wheel drive mode.

5 Claims, 3 Drawing Sheets

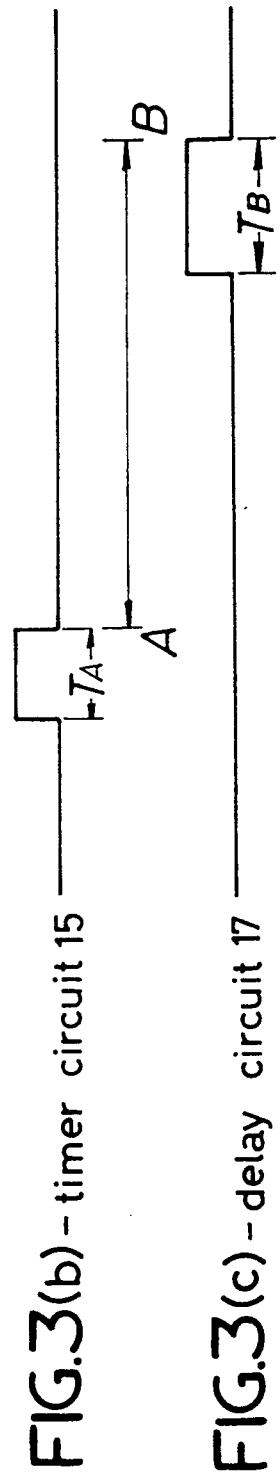
FIG.3(a) - AND circuit 12
FIG.3(b) - timer circuit 15
FIG.3(c) - delay circuit 17

METHOD FOR CONTROLLING A CHANGE-OVER BETWEEN TWO AND FOUR-WHEEL DRIVE MODES FOR A VEHICLE

This application is a continuation of application Ser. No. 672,133, filed on Mar. 19, 1991 which is continuation of originally filed application Ser. No. 364,401, filed on May 26, 1989 both abandoned.

FIELD OF THE INVENTION

The present invention relates to a method for controlling the change-over between two and four-wheel drive modes of a vehicle. The four-wheel drive mode is changed to the two-wheel drive mode when at least one wheel produces a locking tendency during braking.

BACKGROUND OF THE INVENTION

In a control of change-over from a two to a four-wheel drive mode, conventional practice is to restore the drive mode from the two-wheel drive mode to the four-wheel drive mode when there is no tendency for all the wheels to be locked, after the drive mode has been changed from the four-wheel drive mode to the two-wheel drive mode.

Some of the operators or drivers may be accelerating while braking in vehicles equipped with an automatic transmission. In such a case, in spite of a desire to restore the drive mode from the two-wheel drive mode to the four-wheel drive mode, the restoration cannot be achieved when there is a locking tendency produced in the wheels which are driven wheels in the two-wheel drive mode.

SUMMARY OF THE INVENTION

The present invention has been accomplished with the circumstances of the prior art in view, and it is an object of the present invention to provide a method for controlling the changeover between two and four-wheel drive modes of a vehicle, wherein the two-wheel drive mode is smoothly changed to the four-wheel drive mode during acceleration in the two-wheel drive mode.

A first feature of the present invention is in that the two-wheel drive mode is changed to the four-wheel drive mode when the driving wheels in the two-wheel drive mode have no locking tendency. With this first feature, it is possible to smoothly change over two-wheel drive mode to the four-wheel drive mode, when in the two-drive mode a driver is conducting an accelerating operation for the vehicle such as by depressing the accelerator pedal down while having been conducting a braking operation, even if the driven or follower wheels in the two-wheel drive mode show a locking tendency due to the braking operation.

A second feature of the present invention is that when a driven wheel tends to be locked, the two-wheel drive mode is maintained until a predetermined time has elapsed after changing over from the four-wheel drive mode to the two-wheel drive mode. With the second feature, two-wheel drive mode is not changed back to the four-wheel drive mode during an initial stage of changing over from the four wheel drive mode to the two-wheel drive mode, when the driven wheels are in a locking tendency and the driving wheels are not in a locking tendency.

A third feature of the present invention is that even if a locking tendency is produced in a driven wheel in the two-wheel drive mode, the four-wheel drive mode is maintained until a predetermined time has elapsed after changing over from the two-wheel drive mode to the four-wheel drive mode. With the third feature, the four-wheel drive mode is not changed back to the two-wheel drive mode during an initial stage of changing over from the two-wheel drive mode to the four-wheel drive mode, when the driven wheels are in a locking tendency and the driving wheels are not in a locking tendency.

BRIEF DESCRIPTION OF THE DRAWINGS

The drawings illustrate one embodiment of the present invention, wherein

FIG. 3 is a timing chart.

DESCRIPTION OF THE PREFERRED EMBODIMENTS

Figure 1:
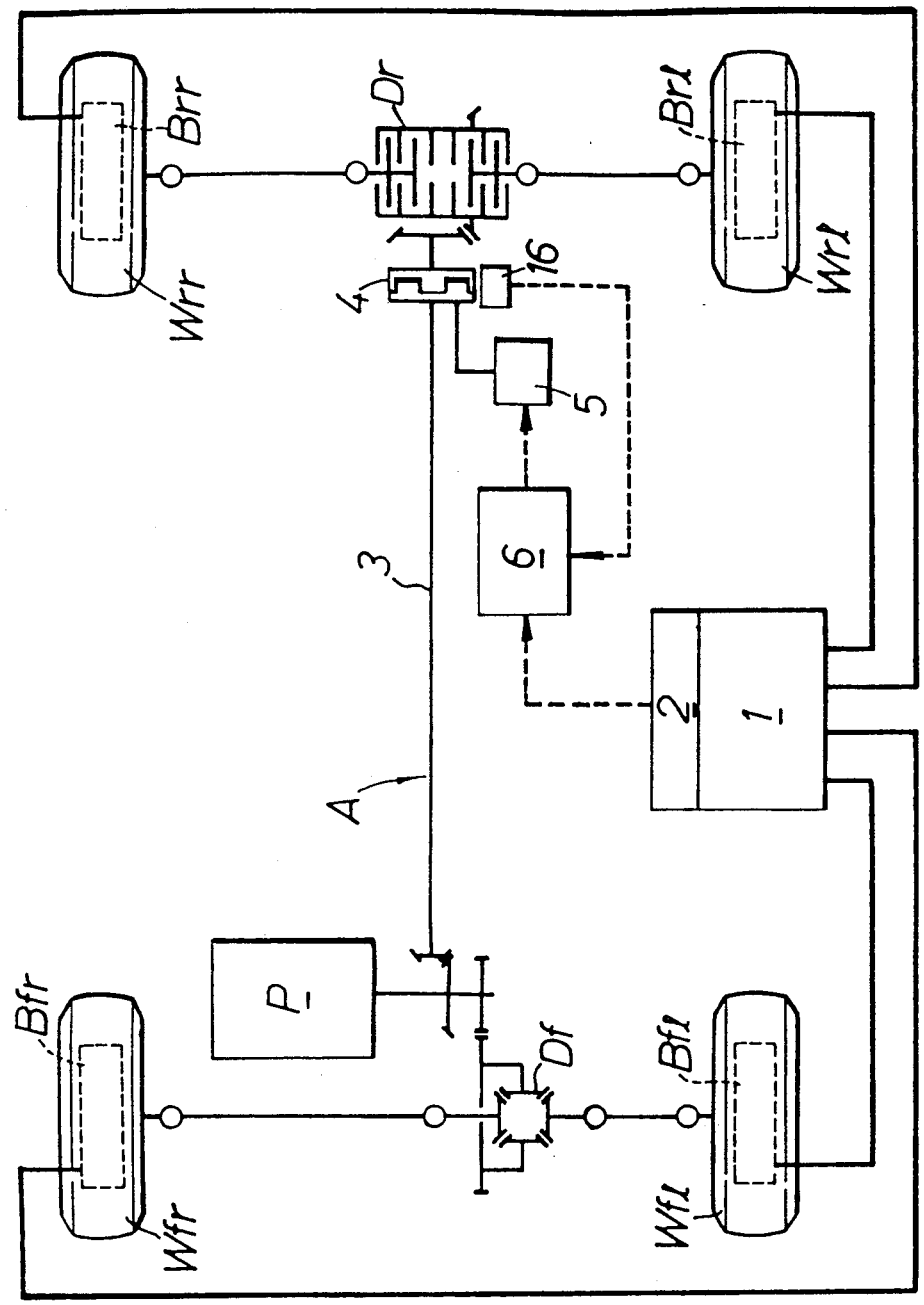
FIG. 1 is a schematic illustration of a driving system.

The present invention will now be described with reference to the accompanying drawings, by way of one embodiment applied in a vehicle in which the front wheels are driving wheels and the rear wheels are driven wheels in a two-wheel drive mode. Referring first to FIG. 1, a pair of front wheels Wfl and Wfr and a pair of rear wheels Wrl and Wrr are suspended respectively on a front portion and a rear portion of a vehicle body (which is not shown). Brakes Bfl and Bfr; Brl and Brr are provided on the front and rear wheels Wfl and Wfr; Wrl and Wrr, respectively.

A hydraulic pressure control circuit 1, to which an anti-lock control means 2 is added for controlling the brakes Bfl and Bfr on the front wheels Wfl and Wfr and the brakes Brl and Brr on the rear wheels Wrl and Wrr with different operation modes, forms a brake device together with brakes Bfl, Brf, Brl and Brr. The anti-lock control means 2 is, for example, to separately control the hydraulic braking pressures for the brake Bfl on the left front wheels Wfl, the brake Bfr on the right front wheel Wfr and the brakes Brl and Brr on the rear wheels Wrl and Wrr. The hydraulic braking pressure is reduced during anti-lock control.

The front and rear wheels Wfl, Wfr, Wrl and Wrr are connected through a driving system A to a power unit P. The driving system A comprises a front differential Df connecting the front wheels Wfl and Wfr with the power unit P, a rear differential Dr connecting the rear wheels Wrl and Wrr, and a propeller shaft 3 connecting the power unit P with the rear differential Dr. At the middle of the propeller shaft, there is a dog clutch 4 which permits changing over between the connection and disconnection between the front and rear wheels Wfl, Wfr and Wrl, Wrr. An actuator 5, such as a cylinder for driving the dog clutch 4, is controlled by a control means 6.

Figure 2:
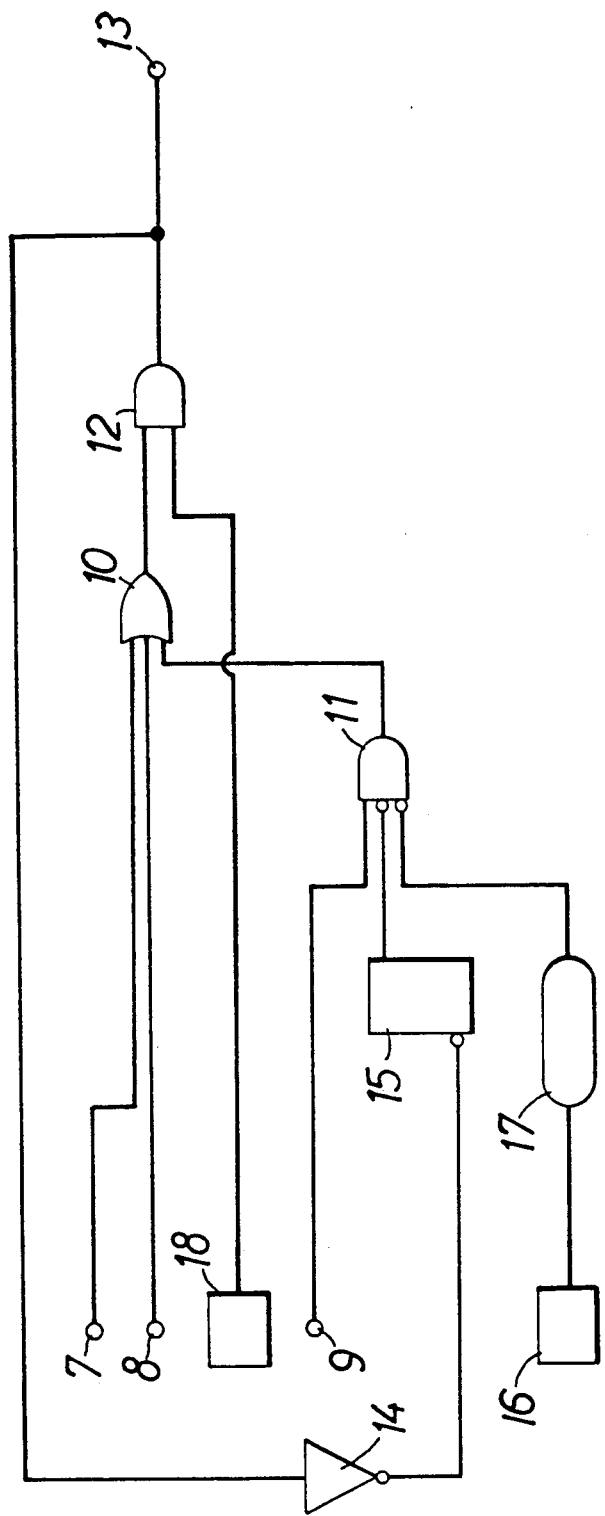
FIG. 2 is a circuit diagram illustrating the arrangement of an essential portion of a control means.

FIG. 2 illustrates the arrangement of an essential portion of the control means 6. A signal indicative of an anti-lock control state is input from the anti-lock control means 2 to input terminals 7, 8 and 9. Specifically, when the brake Bfl of the left front wheel Wfl is being anti-lock controlled, a higher level signal than normal is input to the input terminal 7, and when the brake Bfr of the right front wheel Wfr is being anti-lock controlled, a high level signal is input to the input terminal 8. When the brakes Brl and Brr of both rear wheels Wrl and Wrr are being anti-lock controlled, the high level signal is input to the input terminal 9. The input terminals 7 and 8 are connected in parallel to an OR circuit 10, and the input terminal 9 is connected to an AND circuit 11.

The OR circuit 10 is connected to an AND circuit 12 which is, in turn, connected to an output terminal 13 to deliver a high level signal when the dog clutch 4 is disengaged to change over the four-wheel drive mode into the two-wheel drive mode. The AND circuit 12 is also connected to an invertor circuit 14 which is connected, in an inverted manner, to an input terminal of a timer circuit 15. The timer circuit 15 produces a higher level signal sustained for a given time $T_A$ from the moment when the output from the invertor circuit 14 has been changed from a lower level into a higher level, i.e., when the output from the AND circuit 12 has been changed from a higher level into a lower level to change over the two-wheel drive mode into the four-wheel drive mode. The output from the timer circuit 15 is input, in an inverted manner, to the AND circuit 11.

A detector 16 (see FIG. 1) is added to the dog clutch 4 for detecting the operated state thereof and produces a higher level signal when the dog clutch 4 is in a disengaged state. The detector 16 is connected to a delay circuit 17 which produces a signal rising with a delay of a given time $T_B$ after the rising of a signal produced from the detector 16. The delay circuit 17 is invertedly connected to the AND circuit 11. Thus, output from the AND circuit 11 becomes a high level, when the rear wheels Wrl and Wrr are in a locking tendency, and within a period from a point when the given time $T_A$ has elapsed after changing over of the two-wheel drive mode into the four-wheel drive mode to a point when the given time $T_B$ has elapsed after the change-over into the two-wheel drive mode has been achieved.

A brake switch 18 is also connected to the AND circuit 12 and produces a high level signal when a braking operation has been provided. Therefore, in order that the output from the AND circuit 12 goes to the high level, the braking operation is a necessary condition.

The operation of this embodiment will be described below with reference to FIGS. 3(a) to 3(c). FIG. 3(a) illustrates the output from the AND circuit 12. FIG. 3(b) illustrates the output from the timer circuit 15. FIG. 3(c) illustrates the output from the delay circuit 17. Until the given time $T_A$ elapses after changing over from the two-wheel drive mode into the four-wheel drive mode, the output from the AND circuit 11 is at the lower level. After the given time $T_B$ has elapsed after changing over from the four-wheel drive mode into the two-wheel drive mode, the output from the AND circuit 11 becomes the low level. Therefore the output from the AND circuit 11 becomes the high level, only when the rear wheels Wrl and Wrr show a tendency to be locked, and between a point A, after a lapse of the given time $T_A$ from changing over from the two-wheel drive mode into the four-wheel drive mode, and a point B, after a lapse of the given time $T_B$ after changing over from the four-wheel drive mode into the two-wheel drive mode.

If the braking occurs when the dog clutch 4 is in an engaged state to provide the four-wheel drive mode in which the front wheels Wfl and Wfr are connected to the rear wheels Wrl and Wrr, the output from the AND circuit 12 becomes the high level in response to the output from the OR circuit 10 becoming the high level, so that the dog clutch 4 is disengaged to permit changing over from the four-wheel drive mode into the two-wheel drive mode. In other words, the dog clutch 4 is disengaged to provide the two-wheel drive mode, either in a condition where either one of the front wheels Wfl and Wfr tends to be locked and is anti-lock controlled, or in a condition where the rear wheels Wrl and Wrr are being anti-lock controlled.

In changing over into the two-wheel drive mode, the output from the AND circuit 11 remains at the high level to maintain the two-wheel drive mode, until the given time $T_B$ has elapsed from the point of change-over, when the rear wheels Wrl and Wrr, which are now driven wheels, tend to be locked. Thus, the drive mode is not immediately returned to the four-wheel drive mode when it has been changed over into the two-wheel drive mode in a condition where the rear wheels Wrl and Wrr are in a locking tendency and the front wheels Wfl and Wfr are not in a locking tendency in the four-wheel drive mode.

When at least the front wheels Wfl and Wfr, which are driving wheels, have no locking tendency produced in the two-wheel drive mode, the output from the AND circuit 11 is at the low level after the given time $T_B$ has elapsed after changing over, so that the output from the OR circuit 10 goes to the low level. In response to this, the output from the AND circuit 12 goes to the low level, thereby permitting the dog clutch 4 to be engaged, resulting in the four-wheel drive mode. When the driver is conducting an accelerating operation for the vehicle while having been conducting the braking operation, the drive mode can be rapidly restored from the two-wheel drive mode to the four-wheel drive mode.

With this change-over from the two-wheel drive mode to the four-wheel drive mode, the output from the AND circuit 11 remains at the low level until the given time $T_A$ has elapsed after the change-over. Accordingly, the drive mode is not immediately returned to the two-wheel drive mode when it has been changed over into the four-wheel drive mode in a condition where the rear wheels Wrl and Wrr are in a locking tendency and the front wheels Wfl and Wfr are not in a locking tendency in the two-wheel drive mode.

As discussed above, according to the first feature of the present invention, the two-wheel drive mode is changed to the four-wheel drive mode when the driving wheels have no locking tendency produced in the two-wheel drive mode. Therefore, it is possible to smoothly change over the drive mode to the four-wheel drive mode when in the two-wheel drive mode the driver is conducting an accelerating operation while having been conducting the braking operation for the vehicle.

According to the second feature of the present invention, when the driven wheels tend to be locked, the two-wheel drive mode is maintained until a predetermined time has elapsed after changing over from the four-wheel drive mode to the two-wheel drive mode. Therefore, the two-wheel drive mode is not changed back to the four-wheel drive mode during an initial stage of changing over from the four-wheel drive mode to the two-wheel drive mode, when the driven wheels are in a locking tendency and the driving wheels are not in a locking tendency.

According to the third feature of the present invention, even if a locking tendency is produced in the driven wheels in the two-wheel drive mode, the four-wheel drive mode is maintained until a predetermined time has elapsed after changing over from the two-wheel drive mode to the four-wheel drive mode. Therefore, the four-wheel drive mode is not changed back to two-wheel drive mode during an initial stage of changing over from the two-wheel drive mode to the four-wheel drive mode, when the driven wheels are in a locking tendency, the driving wheels are not in a locking tendency.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method for controlling the change-over between two-wheel and four-wheel drive modes of a vehicle comprising the steps of:

changing a four-wheel drive mode to a two-wheel drive mode when at least one wheel produces a locking tendency during braking;

changing the two-wheel drive mode to the four-wheel drive mode when the driving wheels in the two-wheel drive mode having no locking tendency; and maintaining the two-wheel drive mode until a first predetermined time has elapsed after the change-over from the four-wheel drive mode to the two-wheel drive mode when a driven wheel tends to be locked even if the driving wheels in the two-wheel drive mode have no locking tendency.

2. A method for controlling the change-over between two-wheel and four-wheel drive modes of a vehicle according to claim 1, further comprising the step of maintaining the four-wheel drive mode until a second predetermined time as elapsed after change-over from the two-wheel drive mode to the four-wheel drive mode even if a locking tendency is produced in a driven wheel in the two-wheel drive mode.

3. A method for controlling the change-over between two-wheel and four-wheel drive modes of a vehicle according to claim 2, wherein the vehicle includes a power transmission system provided with clutch means for changing over between the two-wheel and four-wheel drive modes of the vehicle, the method further comprising starting counting of said first predetermined time from an instant when a disengaged state of said clutch means is detected, and starting counting of said second predetermined time from an instant when a command is generated for engaging said clutch means.

4. A method for controlling the change-over between two-wheel and four-wheel drive modes of a vehicle comprising the steps of:

changing a four-wheel drive mode to a two-wheel drive mode when at least one wheel produces a locking tendency during braking;

changing the two-wheel drive mode to the four-wheel drive mode when the driving wheels in the two-wheel drive mode have no locking tendency; and maintaining the four-wheel drive mode until a predetermined time has elapsed after change-over from the two-wheel drive mode to the four-wheel drive mode even if a locking tendency is produced in a driven wheel in the two-wheel drive mode.

5. A method for controlling the change-over between two-wheel and four-wheel drive modes of a vehicle comprising the steps of:

changing a four-wheel drive mode to a two-wheel drive mode when at least one wheel produces a locking tendency during braking;

changing the two-wheel drive mode to the four-wheel drive mode when the driving wheels in the two-wheel drive mode have no locking tendency; and wherein the vehicle has an engine mounted at a front portion thereof and said driving wheels in the two-wheel drive mode are front wheels, said front wheels being subjected to anti-lock control independently from each other and rear wheels of said vehicle being together subjected to anti-lock control in a collective fashion, the method further comprising using signals which are used to carry out the anti-lock control for changing over between the two-wheel drive mode and the four-wheel drive mode.

* * * * *